Aug. 19, 1941.    M. U. DAVIS    2,253,459
FRICTION CLUTCH
Filed March 15, 1939

INVENTOR
M. U. DAVIS
BY M. R. Marsh
ATTORNEY

Patented Aug. 19, 1941

2,253,459

UNITED STATES PATENT OFFICE 2,253,459

FRICTION CLUTCH

Max U. Davis, Lakewood, Ohio, assignor to The Western Union Telegraph Company, New York, N. Y., a corporation of New York Application March 15, 1939, Serial No. 261,908

15 Claims. (Cl. 192—24)

This invention relates in general to clutches and more particularly to friction clutches of the well known type wherein a constantly rotating driving member is at all times in frictional engagement with a normally at rest driven member and as a result of the frictional engagement between the driving and driven member, the driven member tends to rotate with the driving member.

Because of the simplicity, ease of manufacture, cheapness, etc., of friction clutches of the above type, they have considerable application in telegraph machines and particularly in transmitters and receivers employed in conjunction with start-and-stop telegraph systems wherein various driven members such as shafts and sleeves normally at rest are released to rotate with driving members for one revolution at a time in conjunction with the transmission or reception of each code combination. Oftentimes there is considerable load placed on the driven member during the rotation thereof, such as when the cams thereon actuate various cam follows to perform associated functions and because of the fact that substantial synchronism must be maintained between the rotating or distributing members of the transmitters and receivers in systems of the above type, it is necessary that no slippage occur between the driven and driving members during the rotation of the driven member on clutches employed in such machines and in order to prevent any slippage, the pressure between the frictional elements of such clutches is maintained at a substantial amount. With comparatively heavy pressure existing between the frictional elements of such clutches, other things being equal, the wear on the elements is more rapid and in addition a heavy pressure causes the clutch elements to heat when the driven member is held at rest. To dissipate the heat the clutch elements have to be made correspondingly large and where the driven member may be at rest for a considerable length of time, the elements are likely to become excessively hot. The heavy pressure between the frictional elements also impresses more of a load on the driving means when the driven member is at rest than is necessary. Another disadvantage of friction clutches with heavy pressures between the friction elements is that they require more of a force for the tripping member to release the driven member and where the tripping member is actuated by a signal responsive device such as a selector magnet on a receiver any abnormal load on the armature thereof is likely to slow down its operation and throw the receiver out of synchronism or decrease the range.

In view of the above one of the primary objects of the invention is to provide a friction clutch which may be employed in telegraph machines so that when the driven member is at rest in its normal rest position the pressure existing between the frictional elements of the clutch is an appreciable amount less than it is when the driven member is rotating with the driving member.

Another object of the invention is to provide a friction clutch which may be easily tripped.

Still another object of the invention is to provide a friction clutch which has substantially all the advantages of a grab or positive action clutch in maintaining synchronism between the driving and driven members and none of the disadvantages thereof such as noise of operation, expensive parts, high maintenance, etc.

Still another object of the invention resides in the simplicity thereof and the minimum number of parts required to accomplish the above objects.

These and other objects of the invention will be more apparent when taken in conjunction with the following detailed description and the drawing in the latter of which:

The invention as hereinafter described as it would be employed to operate in conjunction with a machine such as a telegraph transmitting keyboard of the well known type wherein a frictionally driven member such as a transmitting sleeve is released for one revolution at a time for rotation with a driving member during which a code combination representative of an actuating key lever is transmitted. However, it will be evident as the description proceeds that the application of the invention is not limited to this particular type of machine, it being thus described merely for the purpose of illustration and that the invention may be employed on various other types of machines.

Figure 1:
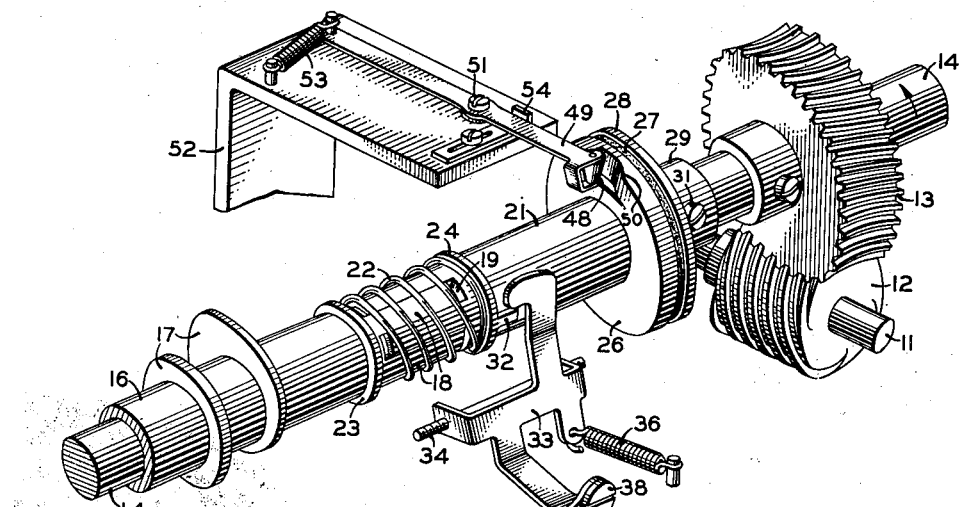
Fig. 1 is a perspective view of a clutch incorporating one embodiment of the present invention, together with a tripping means therefor.

Referring first to Fig. 1, a shaft 11 which may be a shaft of a motor (not shown) is adapted to constantly rotate and has fixed thereto for rotation therewith a helical gear 12. The helical gear meshes with another helical gear 13 located directly thereabove which is fixed for rotation therewith to a shaft 14. Thus the shaft 14 is adapted to constantly rotate, it being suitably journaled adjacent the ends thereof in journals (not shown). Loosely mounted adjacent the left hand end of the shaft 14 is a sleeve 16 which comprises a part of the driven members of the clutch, it being driven from the shaft 14 in a manner hereinafter described. The sleeve 16 is prevented from longitudinal movement along the shaft 14 by means (not shown) and has thereon a set of cams such as 17 which during rotation of the sleeve actuate elements to transmit code combinations in the well known manner. The right hand end of the sleeve 16 has formed therein a series of axially extending tongues 18 which engage grooves, such as 19 formed in the left hand end of a sleeve 21 also loosely mounted on the shaft 14. The sleeve 21 is axially movable along shaft 14 by means hereinafter described but is at all times coupled to the transmitting sleeve 16 by the tongues and grooves 18 and 19 respectively so that the two sleeves always rotate together.

A spring 22 is loosely coiled about the tongues and grooves 18 and 19 between flanges 23 and 24 on the sleeves 16 and 21 respectively. The spring 22 tends to slide the sleeve 21 toward the right along the shaft 14 and holds the right hand face of a friction plate 26 formed integral with the right hand end of the sleeve 21 against the left hand face of a friction disc, such as a felt washer 27, loosely mounted on the shaft 14. The right hand face of the friction element 27 abuts against the left hand face of a second friction plate 28 formed integral with a collar 29 attached to the shaft 14 for rotation therewith by a set screw 31. The friction plate 28 comprises what is hereinafter referred to as the driving member of the clutch and the friction plate 26 comprises the principal driven member. The spring 22 tending to slide the collar or sleeve 21 toward the right is comparatively weak, it being of sufficient strength to only lightly engage the friction plates 26 and 28 with the friction element 27 and therefore the force tending to rotate the sleeves 16 and 21 is comparatively small in the normal stop positions thereof.

The sleeves 16 and 21 are held at rest in their normal rest positions by an axially extending lug or stop 32 formed on the periphery of the sleeve 21 engaging with the upper end of a trip lever 33. The trip lever 33 is pivotally mounted on a rod 34 and an attached spring 36 normally keeps the upper end thereof engaged with or in the path of rotation of the lug 32. The trip lever 33 has a rightwardly extending arm 37 adapted to cooperate with a screw 38 in the substantially horizontal arm of a bell crank 39. The bell crank 39 is pivoted at 41 and the depending arm thereof is adapted to be engaged by a hook shape projection 42 of the end of a lever 43. When the lever 43 moves toward the left, by some means such as the actuation of a key lever, as well known in the art, the hooked portion 42 engages the bell crank 39 to pivot it in a clockwise direction and in so doing causes the trip lever 33 to pivot and withdraw the upwardly extending arm from engagement with the lug 32 on the sleeve 21. Thereupon the sleeves 16 and 21 are free to rotate with the shaft 14 through the action of the friction existing between the friction plates 26 and 28 and the friction disc 27. This friction is comparatively light as hereinbefore described and after the sleeves rotate a slight amount from their rest position this friction force is increased as hereinafter described. As it is desired to release the sleeves 16 and 21 for only one revolution at a time, a bevelled projection 44 on the lever 43 engaging a stationary pin 46 causes disengagement of the hooked portion 42 and the depending arm of the bell crank 39 at substantially the same time that the lug 32 is disengaged from the upwardly extending arm of the trip lever 33. Therefore, the upper end of the trip lever 33 is allowed to be pivoted by its attached spring 36 back on to the periphery of the sleeve 21 and in the path of the lug 32 to bring the sleeve 21 to rest in its normal stop position after one revolution thereof. In this manner the lever 43 does not hold the trip lever 33 operated and the sleeves 16 and 21 are invariably stopped in their normal stop positions following each revolution thereof regardless of the length of time the lever 43 may be held in an operated position.

Figures 2, 4:
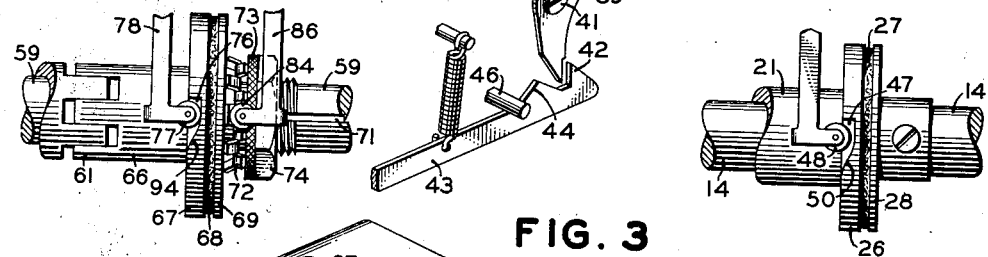
Fig. 2 is a fragmentary plan view of some of the elements of Fig. 1.
Fig. 4 is a fragmentary plan view of some of the elements of Fig. 3.

The left hand face of the friction plate 26 has a recess or notch 47 therein with a sloping surface 50 on one side thereof which gradually comes out to the full thickness of the friction plate. In the normal stop position of the sleeve 21 and plate 26, a tapered roller 48 is in this recess 47. The roller 48 is mounted on one end of a horizontal lever 49 pivoted adjacent its center on a screw 51 mounted in a bracket 52. A spring 53 attached to the opposite end of the lever 49 tends to pivot the lever and hold it against an adjustable stop 54 secured to the bracket 52. The bracket 54 is adjusted so that in the normal stop position of the sleeve 21 the roller 48 just clears the bottom of the recess 47 as shown in Fig. 2. As the roller 48 just clears the bottom of recess 47 it exerts no pressure on the friction plate 26 in its normal rest position.

When the sleeve 21 is released as hereinbefore described by the actuation of the lever 43 and has rotated a slight amount from its rest position the sloping surface 50 of the recess starts to engage the roller 48. Thereupon the pressure of the friction plates 26 and 28 on the friction element 27 is increased due to the action of the roller 48 tending to push a friction plate 26 toward the right by means of the spring 53 attached to the lever 49. During further rotation of the friction plate 26 the roller 48 rides up the sloping surface 50 and the lever 49 pivots a slight amount in a clockwise direction to stretch the spring 53. At this time the recess 47 will have rotated out of operative relation with the roller 48 and the roller will be in engagement with the smooth portion on the left hand face of the friction plate 26 and be exerting a pressure thereon which is transmitted to the friction disc 27. This increased pressure on the friction disc 27, as is well known, increases the frictional drag on the friction plate 26 and therefore the torsional rotative force tending to rotate the sleeves 16 and 21 is increased. This increased torsional rotative force remains effective during substantially the remainder of a revolution, or until the sleeve 21 completes a revolution and is stopped in its normal position by the lug 32 engaging the upper end of the trip lever 33, at which time the recess 47 rotates into operative relation with the roller 48. The spring 53 thereupon forces the roller 48 into the recess 47 and the pressure exerted thereby on the left hand face of the friction plate 26 is released. Thereupon the only pressure existing between the friction plate 26 and the friction element 27 is exerted by the comparatively weak spring 22.

Thus it can be seen that in the normal stop position of the sleeve 21 only a slight minimum pressure of the friction plates 26 and 28 on the friction disc 27 exists and shortly after the sleeve 21 is released for rotation, the pressure is gradually increased, and this increased pressure is maintained throughout substantially the remainder of the revolution of the sleeve 21 whereupon the pressure is reduced to the minimum.

With a clutch of the above type where the friction is decreased during inoperative periods of the driven member, such as the sleeve 21, there is obviously less wear on the friction elements and the clutch will run much cooler, other things being equal. Such a clutch also has the advantage that during non-operative periods there is less load on the driving means, such as the electric motor, and consequently a saving in power.

Figure 3:
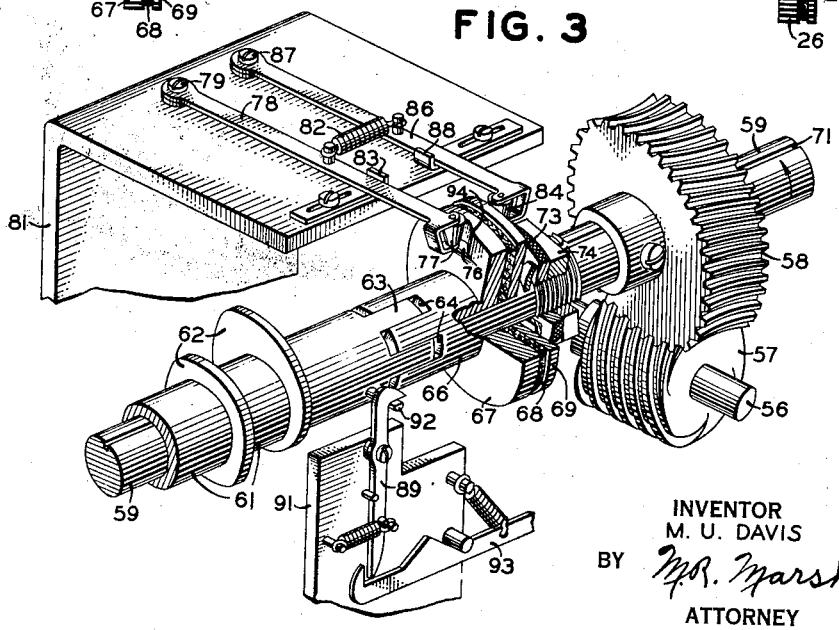
Fig. 3 is a perspective view of a modification of the invention.

Referring now to Figs. 3 and 4, a modification of the invention will now be described which has certain advantages over the type hereinabove described and shown in Figs. 1 and 2. In Fig. 3 a constantly rotating shaft 56, such as a motor shaft, has fixed thereto a gear 57 which meshes with a gear 58 located thereabove and fixed to a shaft 59 for rotation therewith. Thus the shaft 59 is adapted to be constantly rotated, it being journaled adjacent its ends in suitable journals (not shown). Loosely mounted on the shaft 59 adjacent the left hand end thereof is a sleeve member 61 which, in the case where the clutch is used on a telegraph keyboard, would be the transmitting sleeve. The sleeve 61 has arranged thereon in fixed relation for rotation therewith a series of transmitting cams such as 62 which when rotating actuate contacts (not shown) to transmit a code combination representative of an actuated key lever. The sleeve 61 is prevented from moving longitudinally on the shaft 59 by suitable means and formed on the right hand end thereof is a series of axially extending tongues 63. The tongues 63 engage complementary slots such as 64 formed in the left hand end of a sleeve 66 also loosely mounted on the shaft 59. The sleeve 66 is movable along the shaft 59 by means hereinafter described, but is at all times operatively engaged with the sleeve 61 for rotation therewith by means of the interengaging tongues and grooves 63 and 64.

Formed integrally with the sleeve 66 adjacent the right hand end thereof and extending radially therefrom is a disc-shaped friction plate 67. The right hand face of the friction plate 67 abuts against the left hand face of a friction disc 68 such as a felt washer. The right hand face of the friction disc 68 abuts against the left hand face of a friction plate 69 which comprises the primary driving element of the clutch. The friction plate 69 is movable axially along the shaft 59 but is adapted to rotate therewith by means of a projection on the inner circumference thereof (not shown) engaging a keyway 71 in the shaft 59. At the right of the friction plate 69 is a flat circular spring 72 which, as hereinafter described, tends to slide the friction plate 69 toward the left. To the right of the spring 72 is an adjusting disc 73 which is threaded onto the shaft 59 and serves to vary the pressure the spring 72 exerts on the friction plate 69 in the manner hereinafter described. A locking nut 74 is also threaded on the shaft 59 and serves to lock the adjusting disc 73 in position.

Formed in the left hand face of the friction plate 67 is a recess 76 and with the sleeves 61 and 66 stopped in their normal positions, a tapered roller 77 engages the bottom of the recess 76. The roller 77 is pivotally mounted on the free end of a lever 78, which in turn is pivotally mounted on a screw 79 supported in a fixed bracket 81. A spring 82 attached to the lever 78 tends to pivot the same in a counter-clockwise direction and normally holds the lever against an adjustable stop 83 on the bracket 81. The adjusting disc 73 is adjusted so that when the sleeve 66 is stopped in its normal rest position as hereinafter described, the spring 72 exerts only a slight pressure on the friction plate 69 which is transmitted through the friction disc 68 and friction plate 67 to the roller 77. The tension of the spring 82 is sufficient to overcome the force of the spring 72, and accordingly the lever 78 remains against its stop 83. In operative relation with the right hand face of the friction plate 69 is a tapered roller 84, which is carried in the free end of a lever 86 pivotally mounted on a shoulder screw 83 in the bracket 81. The spring 82 is attached to the lever 86 and tends to pivot it in a clockwise direction and normally holds the lever against an adjustable stop 88 on the bracket 81. The stop 88 is adjusted so that in the normal rest position of the sleeve 66 there is a slight clearance between the roller 84 and the right hand face of the friction disc 69, the two being brought into engagement in a manner hereinafter described during rotation of the driven elements in the clutch.

The sleeve 61 is held at rest in its normal rest position by a trip arm 89 pivotally mounted on a bracket 91 engaging a stop pin 92 extending radially from the sleeve 61. A lever 93 when operated is adapted to momentarily actuate a trip lever 89 to release the sleeve 61 for one revolution at a time in the well known manner. When the sleeve 61 is released as hereinbefore described, it starts to rotate due to the pressure of the friction plates 67 and 69 on the friction disc 68, which is created by the spring 72, this pressure as stated being very slight and only sufficient to maintain a slight drag between the friction plates and friction disc. After the friction plate 67 has rotated a few degrees from its normal rest position the sloping edge 94 of the recess 76 engages the roller 77, and as the plate continues to rotate the roller 77 cams the plate toward the right. This movement of the plate 67 increases the pressure on the spring 72, and consequently increases the pressure of the friction plates 67 and 69 on the friction element 68, the strength of spring 82 being sufficient to overcome that of the spring 72. Accordingly there will be no appreciable movement of the lever 78 until the roller 77 has ridden on the sloping edge 94 of the recess 76 an amount sufficient to move the friction plates 67 and 69 together with the friction element 68 to bring the right hand face of the friction plate 69 into engagement with the roller 84 on the lever 86. At this time, the recess 76 will have rotated nearly out of operative relation with the roller 77 and further rotation thereof causes one or both of the levers 78 and 86 to pivot away from engagement with their respective stops 83 and 88. Thereupon the pressure between the friction plate 67 and 69 is increased by an amount proportional to the tension in the spring 82, and this pressure continues to be exerted throughout substantially the remainder of the revolution of the sleeve 66. The tension of the spring 82 is such that it creates a pressure between the friction plates 67 and 69 so that the frictional force tending to rotate the driven plate 67 is sufficient to overcome any load that is normally placed on the transmitting sleeve 61. When the sleeve 61 completes a revolution the recess 76 rotates into operative relation with the roller 77 whereupon the levers 78 and 86 are allowed to pivot back into their normal positions against the stops 82 and 83, respectively, whereupon the pressure existing between the plates 67 and 69 is dependent solely on that created by the spring 72.

Thus the frictional force tending to rotate the driven member 66 is a minimum amount during inoperative conditions of the sleeve and shortly after the sleeve is released for rotation the frictional force is progressively increased and is maintained at the increased amount throughout substantially the remainder of the revolution, the pressure being returned to the minimum at the completion of a revolution.

This modification has the advantage in that the pressure of the spring 72 can be easily adjusted so that the minimum frictional force tending to rotate the driven sleeve 66 may be easily varied to suit the various operating conditions. With a small or light frictional force tending to rotate the driven members 61 and 66, the pressure existing between the stop pin 92 and the trip lever 89 is consequently a small amount and obviously the trip lever 89 can be more easily actuated when this pressure is a minimum. This feature of being able to easily trip or release the driven members is likewise present in the modification shown in Figs. 1 and 2 and is very advantageous when the driven members are employed in machines such as telegraph receivers where the trip lever is actuated by the magnet such as the selector magnet.

It will be obvious, of course, that various other modifications of the invention may be made without departing from the spirit or essential attributes thereof, and it is desired therefore that only such limitations be placed thereon as are imposed by the prior art or are specifically set forth in the appended claims.

What is claimed is:

1. In a device of the type described, a normally rotating driving member, a normally at rest driven member, a friction element disposed between said driven and driving members, means normally holding said driven and driving members and said friction element together with a pressure of a first predetermined amount, a stop for said driven member, means for operating said stop member to release said driven member for rotation with said driving member, means for increasing the pressure between said driven and driving members and means invariably and automatically operative during the rotation of said driven member for operating said last mentioned means to increase the pressure of said driven and driving members on said friction element to a second predetermined amount.

2. In a device of the type described, a normally rotating driving member, a normally at rest driven member, a friction element disposed between said driven and driving members, means normally holding said driven and driving members and said friction element together with a pressure of a first predetermined amount, a stop member for said driven member, means for operating said stop member to release said driven member for rotation with said driving member, a movable member, means operative during the rotation of said driven member for moving said member to increase the pressure of said driven and driving members on said friction element to a second predetermined amount and means including said movable member controlled by said driven member following each revolution thereof for decreasing the pressure of said driven and driving members on to said friction element to said first predetermined amount.

3. In a device of the type described, a normally rotating driving member, a normally at rest driven member, a friction element disposed between said driven and driving members, a first resilient means normally holding said driven and driving members and said friction element together with a pressure of a first predetermined amount, a second resilient means, a stop member for said driven member, means for operating said stop member to release said driven member for one revolution at a time with said driving member and means controlled by the movement of said driven member from said rest position for rendering said second resilient means effective to increase the pressure of said driven and driving members on said friction element to a second predetermined amount.

4. In a device of the type described, a normally rotating driving member, a normally at rest driven member, a friction element disposed between said driven and driving members, a first resilient means normally holding said driven and driving members and said friction element together with a pressure of a first predetermined amount, a second resilient means, means for releasing said driven member for rotation with said driving member, means controlled by the movement of said driven member from said rest position for rendering said second resilient means effective to increase the pressure of said driven and driving members on said friction element to a second predetermined amount, means for invariably stopping said driven member after each revolution thereof and means for rendering said second resilient means ineffective on the stopping of said driven member at the end of each revolution in said normal rest position.

5. In a clutch of the type described, a normally rotating driving member, a normally at rest driven member, a friction element between said driving and driven members, a first resilient member adapted to exert a force in an axial direction on said driven member to hold the same with said friction element in frictional engagement with said driving member whereby said driven member tends to rotate therewith with a first predetermined torsional rotative force, a stop member for said driven member, means for operating said stop member to release said driven member for rotation with said driving member for one revolution at a time, a second resilient means, a movable element and means dependent upon the torsional rotative force of said driven member during the rotation thereof for operating said movable element to render said second resilient means effective to exert an additional force in an axial direction on said driven member whereby said driven member rotates with said driving member with a second predetermined torsional rotative force.

6. In a clutch of the type described, a normally rotating driving member, a normally at rest driven member, a friction element between said driving and driven members, a first resilient member adapted to exert a force in an axial direction on said driven member to hold the same with said friction element in frictional engagement with said driving member whereby said driven member tends to rotate therewith with a first predetermined rotative force, a stop member for said driven member, means for operating said stop member to release said driven member for rotation with said driving member for one revolution at a time, a second resilient means, a movable member, means dependent upon the rotative force of said driven member during the rotation thereof for moving said member to render said second resilient means effective to exert an additional force in an axial direction on said driven member whereby said driven member rotates with said driving member with a second predetermined rotative force and means including said movable member as controlled by said driven member at substantially the end of a revolution thereof for releasing the force in an axial direction on said driven member exerted by said second resilient means to return the rotative force of said driven member to said first predetermined amount.

7. In a clutch of the type described, a normally rotating driving member, a normally at rest driven member, a friction element between said driving and driven members, a first resilient members adapted to exert a force in an axial direction on said driven member to hold the same with said friction element in frictional engagement with said driving member whereby said driven member tends to rotate therewith with a first predetermined torsional rotative force, a stop member for said driven member means for operating said stop member to release said driven member for rotation with said driving member, a second resilient means, movable elements, means dependent upon the torsional rotative force of said driven member during the rotation thereof for moving said movable elements partially render said second resilient means effective to exert an additional force in an axial direction on said driven member to increase the torsional rotative force thereof and means including the increased torsional rotative force of said driven member for progressively rendering the remainder of said second resilient means effective to increase the force in an axial direction on said driven member to increase said torsional rotative force to a second predetermined amount.

8. In a clutch of the type described, a normally rotating driving member, a normally at rest driven member, a friction element between said driving and driven members, a first resilient member adapted to exert a force in an axial direction on said driven member to hold the same with said friction element is frictional engagement with said driving member whereby said driven member tends to rotate therewith with a first predetermined torsional force, a stop member for said driven member, means for operating said stop member to release said driven member for rotation with said driving member, a second resilient means, movable elements, means dependent upon the torsional force of said driven member during the rotation thereof for operating said movable elements to partially render said second resilient means effective to exert an additional force in an axial direction on said driven member to increase the torsional rotative force thereof, means including the increased torsional rotative force of said driven member for progressively rendering the remainder of said second resilient means effective to increase the force in an axial direction on said driven member to increase said torsional rotative force to a second predetermined amount and means controlled by said driven member at substantially the end of a revolution thereof to control the operation of said movable elements to render said second resilient means ineffective on said driven member whereby the torsional force on said driven member is restored to said first predetermined amount.

9. In a friction clutch of the type described, a normally rotating shaft, a driving member secured to said shaft for rotation therewith, a friction element, a driven member normally at rest freely mounted on said shaft and axially movable thereon to frictionally engage said friction element with said driving member, a first resilient means normally urging said driven member into engagement with said friction element and said driving member with a first predetermined force, a stop member for said driven member, means for operating said stop member to release said driven member for one revolution at a time, a bevelled surface on said driven member, a spring biased roller associated with said bevelled surface, means including said roller and said bevelled surface for increasing the pressure of said driving member on to said friction element and said driving member during the rotation of said driven member and means for maintaining said increased pressure for substantially the entire rotation of said driven member.

10. In a clutch of the type described, a rotating shaft, a driving member rotatable with said shaft and axially movable relative thereto, a driven member normally at rest, freely mounted on said shaft and axially movable relative thereto, a friction element disposed between said driven and driving members, said friction element tending to rotate said driven member with said driving member with a torsional rotative force proportional to the pressure of said driven and driving members on said friction element, a first resilient means adapted to maintain a first predetermined pressure of said driven and driving members on said friction element, a stop member for said driven member, means for operating said stop member to release said driven member with said driving member, means cooperating with said driven member during the initial rotative movement thereof to axially move the same to increase the pressure of said first resilient means to a second predetermined amount, a second resilient means, movable members, and means including said movable members operative following the increase in pressure of said first resilient means for rendering said second resilient means effective to increase the pressure of said driven and driving members on said friction element to a third predetermined amount.

11. In a clutch of the type described, a rotating shaft, a driving member rotatable with said shaft and axially movable relative thereto, a driven member normally at rest, freely mounted on said shaft and axially movable relative thereto, a friction element disposed between said driven and driving members, said friction element tending to rotate said driven member with said driving member with a torsional rotative force proportional to the pressure of said driven and driving members on said friction element, a first resilient means adapted to maintain a first predetermined pressure of said driven and driving members on said friction element, a stop member for said driven member, means for operating said stop member to release said driven member for one revolution at a time with said driving member, means cooperating with said driven member during the initial rotative movement thereof to axially move the same to increase the pressure of said first resilient means to a second predetermined amount, a second resilient means, movable elements, means including said movable elements operative following the increase in pressure of said first resilient means for rendering said second resilient means effective to increase the pressure of said driven and driving members on said friction element to a third predetermined amount, and means controlled by said driven member at the end of each revolution thereof with said driving member for controlling said movable elements to decrease the pressure of said driven and driving members on said friction element to said first predetermined amount.

12. In a clutch of the type described, a rotating shaft, a driving member rotatable with said shaft and axially movable relative thereto, a driven member normally at rest, freely mounted on said shaft and axially movable relative thereto, a friction element disposed between said driven and driving members, said friction element tending to rotate said driven member with said driving member with a torsional rotative force proportional to the pressure of said driven and driving members on said friction element, a first resilient means adapted to maintain a first predetermined pressure of said driven and driving members on said friction element, a stop member for said driven member, means for operating said stop member to release said driven member for one revolution at a time with said driving member, cam means associated with said driven member, a cam follower associated with said cam means, a second resilient means, means including said cam and follower operative during the initial rotative movement of said driven member for axially moving said driven and driving members to increase the pressure therebetween created by said first resilient means to a second predetermined amount, means operative after the increase of said pressure to said second predetermined amount and including only said second resilient means for increasing the pressure of said driven and driving members on said friction element to a third predetermined amount and means controlled by said driven member at the end of each revolution thereof for conditioning said cam means and follower to decrease the pressure of said driven and driving members on said friction element to said first predetermined amount.

13. In a clutch of the type described, a rotating shaft, a disc shaped driving member rotatable with said shaft and axially movable relative thereto, a disc shaped driven member normally at rest, freely mounted on said shaft and also axially movable relative thereto, a friction element disposed between the inside faces of said driven and driving members, said friction element tending to rotate said driven member with said driving member with a torsional rotative force proportional to the pressure of said driven and driving members on said friction element, a first resilient means adapted to maintain a first predetermined pressure of said driven and driving members on said friction element, a stop member for said driven member, means for operating said stop member to release said driven member for one revolution at a time with said driving member, a recess in the outside face of said driven member and having a sloping surface relative to the direction of rotation thereof, a first follower in said recess in the normal stop position of said driven member, a second follower in operative relation with the outside face of said driving member, said first and second followers being resiliently biased in said normal positions, means including said first follower and the sloping surface of said recess and operative during a first predetermined portion of the rotation of said driven members to bring the outside face of said driving member into engagement with the said second follower whereupon the pressure of said driven and driving members on said friction element is increased proportionally to the strength of the resilient means biasing said followers.

14. In a friction clutch of the type described, a normally rotating driving member, a normally at rest driven member tending to rotate with said driving member with a first predetermined torsional rotative force, a stop member for stopping said driven member, means for operating said stop member to release said driven member for rotation with said driving member, cam means controlled by said driven member during the rotation thereof for invariably and automatically varying the torsional rotative force thereon, means including said stop member for stopping said driven member in invariable position and means including said cam means operative by said driven member on the stopping thereof for returning the torsional rotative force thereof to said first predetermined value.

15. In a device of the type described, a normally rotating shaft, a driving member fixed to said shaft for rotation therewith and having a disc-shaped portion, a driven member loosely mounted and axially movable on said shaft, also having a disc-shaped portion, a friction element disposed between the inside faces of the disc-shaped portions of said driven and driving members, a resilient means adapted to press said driven member and said friction element against said driving member with a first predetermined pressure, a recess in the outside face of the said driven member having a sloping surface relative to the direction of rotation thereof, a spring biased follower in said recess in the normal position of said driven member, means for releasing said driven member for one revolution at a time and invariably bringing to a stop thereafter and means including said sloping surface cooperating with said follower and operative during a predetermined portion of each revolution of said driven member for increasing the pressure of said driving member and said friction element against said driving member an amount proportional to the strength of said follower biasing means.

MAX U. DAVIS.